United States Patent [19]
Honjo

[11] Patent Number: 5,557,331
[45] Date of Patent: Sep. 17, 1996

[54] IMAGE ENCODING METHOD, AN IMAGE ENCODING CIRCUIT, AN IMAGE ENCODING APPARATUS, AND AN OPTICAL DISK

[75] Inventor: Masahiro Honjo, Sakai, Japan

[73] Assignee: Matsushita Electric Industrial Co., Ltd., Osaka, Japan

[21] Appl. No.: 212,101

[22] Filed: Mar. 11, 1994

[30] Foreign Application Priority Data

Mar. 11, 1993 [JP] Japan .................................. 5-050467

[51] Int. Cl.⁶ .................................................... H04N 7/50
[52] U.S. Cl. ........................ 348/410; 348/423; 358/335
[58] Field of Search .................................. 348/400, 401, 348/409, 410, 423; 358/339, 335; H04N 7/137

[56] References Cited

U.S. PATENT DOCUMENTS 5,282,049 1/1994 Hatakenaka ............................ 358/335
5,339,167 8/1994 Kuroda .................................... 358/339

OTHER PUBLICATIONS

K. Emihara, *International Standard for Multimedia Encoding*, pp. 106–111, 126–133, Jun. 30, 1991 (partial English translation provided).

*Primary Examiner*—Howard W. Britton
*Attorney, Agent, or Firm*—Ratner & Prestia

[57] ABSTRACT

A method for encoding image data according to the present invention includes the steps of: specifying a type of a picture in a picture sequence including an I-picture, a P-picture and a B-picture; determining a position of at least one slice header in the picture in accordance with the type of the picture; and inserting the at least one slice header at the position determined in the determining step, wherein the position of the slice header is determined so that at least one of the relationships $N_i > N_b$ and $N_p > N_b$ is satisfied, where $N_i$ denotes the number of slices in the I-picture, $N_p$ denotes the number of slices in the P-picture and $N_b$ denotes the number of slices in the B-picture.

19 Claims, 8 Drawing Sheets

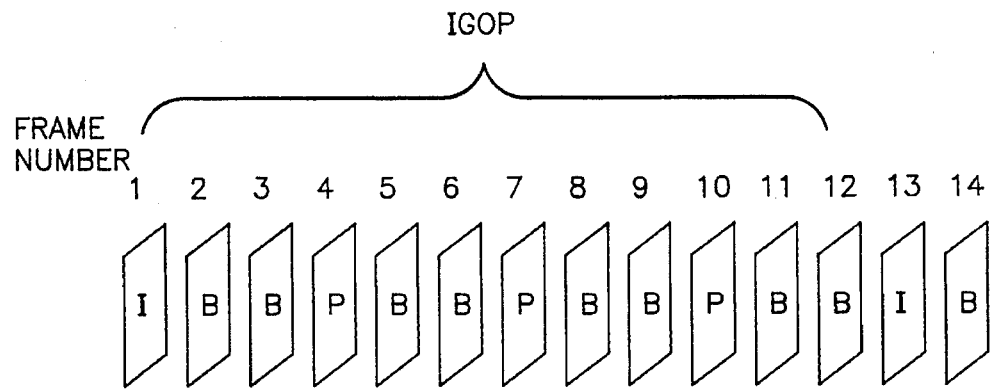
FIG. IA
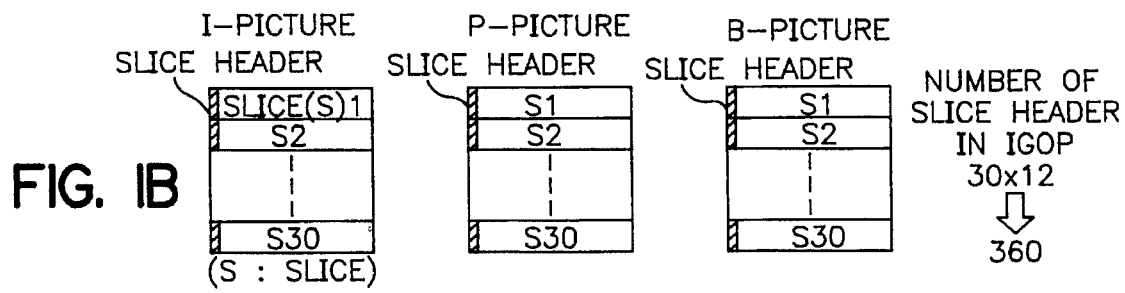
FIG. IB
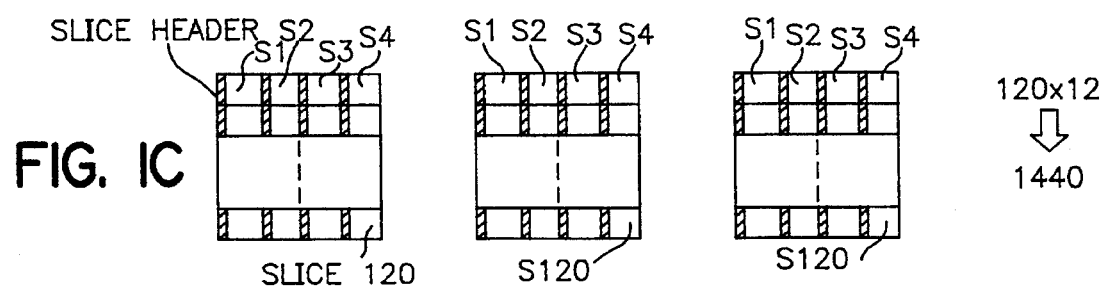
FIG. IC
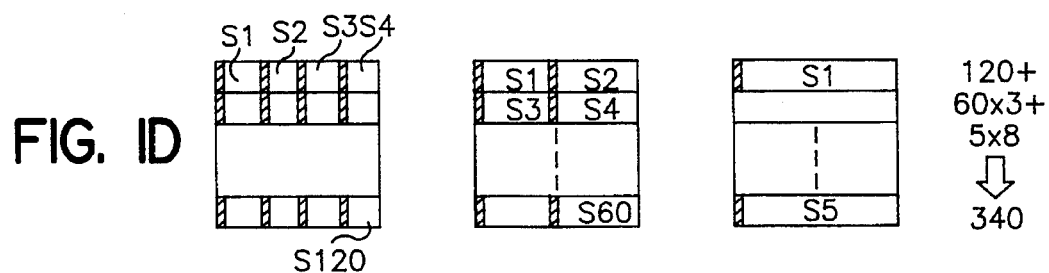
FIG. ID
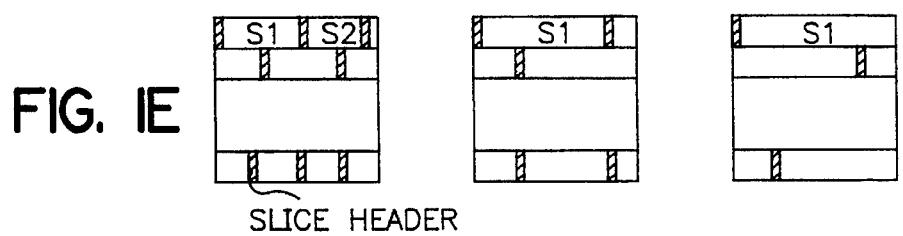
FIG. IE

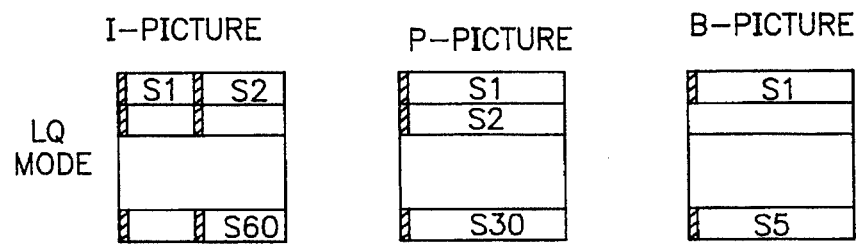
FIG. 4A  LQ MODE
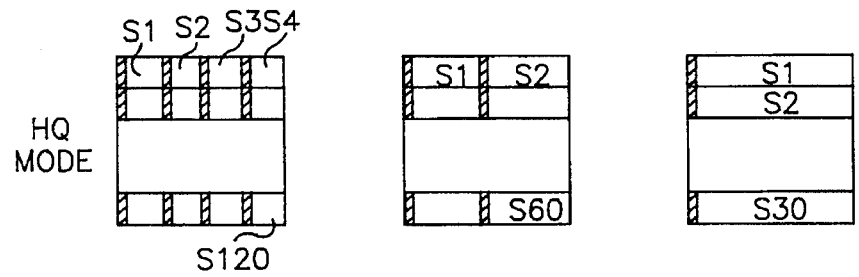
FIG. 4B  HQ MODE

IMAGE ENCODING METHOD, AN IMAGE ENCODING CIRCUIT, AN IMAGE ENCODING APPARATUS, AND AN OPTICAL DISK

BACKGROUND OF THE INVENTION

1. Field of the Invention

The present invention relates to an image encoding method, an image encoding circuit, an image encoding apparatus, and an optical disk for using an image signal that is digital band-compressed in a system in which errors may occur.

2. Description of the Related Art

In recent years, efforts to standardize moving picture coding methods as a standard for storage media such as CD-ROMs have been made by MPEG (Moving Picture Expert Group) of ISO/IEC SC29/WG11. In general, storing image data requires a huge amount of memory. Accordingly, techniques for efficiently compressing images to be stored in a storage medium are regarded as extremely important. An image coding method proposed by MPEG utilizes a DCT (Discreet Cosine Transform) method so as to reduce the redundancy of images in the spatial axis directions, and utilizes a predictive coding method so as to reduce the redundancy of the images in the time axis direction. The predictive coding takes advantage of the fact that there is a similarity between an identified image and its preceding images and succeeding images in successive moving pictures. Specifically, the predictive coding codes the difference between the image data to be coded and the preceding/succeeding image data, whereby the amount of data to be coded is greatly reduced.

According to the predictive coding method, given image data is used in the coding of other image data. As a result, an error that has occurred in the given image data is inevitably propagated to the image data to be predicted from the given image data. As the propagation range of the error increases, the process for correcting the error for reconstructing the image data becomes more complicated.

SUMMARY OF THE INVENTION

A method for encoding image data according to the present invention comprises the steps of: specifying a type of a picture in a picture sequence including an I-picture, a P-picture and a B-picture; determining a position of at least one slice header in the picture in accordance with the type of the picture; and inserting at least one slice header at the position determined in the determining step, wherein the position of the slice header is determined so that at least one of the relationships $N_i > N_b$ and $N_p > N_b$ is satisfied, where $N_i$ denotes the number of slices in the I-picture, $N_p$ denotes the number of slices in the P-picture and $N_b$ denotes the number of slices in the B-picture.

In one embodiment of the invention, the position of the slice header is determined so that at least one of the relationships $M_i < M_b$ and $M_p < M_b$ is satisfied, where $M_i$ denotes the number of macro blocks included in each slice in the I-picture, $M_p$ denotes the number of macro blocks included in each slice in the P-picture and $M_b$ denotes the number of macro blocks included in each slice in the B-picture.

In another embodiment of the invention, the method further comprises a step of switching between a first mode of low compression rate and a second mode of high compression rate, wherein the position of the slice header is determined so that the number of slices in the picture in the first mode is larger than the number of slices in the picture in the second mode.

Alternatively, a method for encoding image data according to the present invention comprises the steps of: detecting an amount of data in a picture in a picture sequence including an I-picture, a P-picture and a B-picture; determining a position of at least one slice header in the picture in accordance with the amount of data in the picture; and inserting at least one slice header at the position determined in the determining step, wherein the position of the slice header is determined so that the amount of data contained in each slice in the picture is maintained at substantially the same value irrespective of the type of the picture.

In one embodiment of the invention, the method further comprises a step of switching between a first mode of low compression rate and a second mode of high compression rate, wherein the position of the slice header is determined so that the number of slices in the picture in the first mode is larger than the number of slices in the picture in the second mode.

A circuit for encoding image data according to the present invention comprises: picture type specifying means for specifying a type of a picture in a picture sequence including an I-picture, a P-picture and a B-picture; slice header position determining means for determining a position of at least one slice header in the picture in accordance with the type of the picture; and slice header inserting means for inserting at least one slice header at the position determined by the slice header position determining means, wherein the position of the slice header is determined so that at least one of the relationships $N_i > N_b$ and $N_p > N_b$ is satisfied, where $N_i$ denotes the number of slices in the I-picture, $N_p$ denotes the number of slices in the P-picture and $N_b$ denotes the number of slices in the B-picture.

In one embodiment of the invention, the position of the slice header is determined so that at least one of the relationships $M_i < M_b$ and $M_p < M_b$ is satisfied, where $M_i$ denotes the number of macro blocks included in each slice in the I-picture, $M_p$ denotes the number of macro blocks included in each slice in the P-picture and $M_b$ denotes the number of macro blocks included in each slice in the B-picture.

In another embodiment of the invention, the circuit further comprises means for switching between a first mode of low compression rate and a second mode of high compression rate, wherein the position of the slice header is determined so that the number of slices in the picture in the first mode is larger than the number of slices in the picture in the second mode.

Alternatively, a circuit for encoding image data according to the present invention comprises: detecting means for detecting an amount of data in a picture in a picture sequence including an I-picture, a P-picture and a B-picture; determining a position of at least one slice header in the picture in accordance with the amount of data in the picture; and inserting at least one slice header at the position determined by the slice header position determining means, wherein the position of the slice header is determined so that the amount of data in each slice in the picture is maintained at substantially the same value irrespective of the type of the picture.

In one embodiment of the invention, the circuit further comprises means for switching between a first mode of low compression rate and a second mode of high compression rate, wherein the position of the slice header is determined so that the number of slices in the picture in the first mode is larger than the number of slices in the picture in the second mode.

An apparatus according to the present invention comprises: encoding means for encoding image data; and recording means for recording the encoded image data in a recording medium, the encoding means comprising: picture type specifying means for specifying a type of a picture in a picture sequence including an I-picture, a P-picture and a B-picture; slice header position determining means for determining a position of at least one slice header in the picture in accordance with the type of the picture; and slice header inserting means for inserting at least one slice header at the position determined by the slice header position determining means, wherein the position of the slice header is determined so that at least one of the relationships $N_i > N_b$ and $N_p > N_b$ is satisfied, where $N_i$ denotes the number of slices in the I-picture, $N_p$ denotes the number of slices in the P-picture and $N_b$ denotes the number of slices in the B-picture.

In one embodiment of the invention, the position of the slice header is determined so that at least one of the relationships $M_i < M_b$ and $M_p < M_b$ is satisfied, where $M_i$ denotes the number of macro blocks included in each slice in the I-picture, $M_p$ denotes the number of macro blocks included in each slice in the P-picture and $M_b$ denotes the number of macro blocks included in each slice in the B-picture.

In another embodiment of the invention, the encoding means further comprises means for switching between a first mode of low compression rate and a second mode of high compression rate, wherein the position of the slice header is determined so that the number of slices in the picture in the first mode is larger than the number of slices in the picture in the second mode.

In still another embodiment of the invention, the apparatus further comprises reproduction means for reproducing image data recorded in the recording medium and decoding means for decoding the reproduced image data.

Alternatively, an apparatus according to the present invention comprises: encoding means for encoding image data; and recording means for recording the encoded image data in a recording medium, the encoding means comprising: detecting means for detecting an amount of data in a picture in a picture sequence including an I-picture, a P-picture and a B-picture; determining a position of at least one slice header in the picture in accordance with the amount of data in the picture; and inserting the at least one slice header at the position determined by the slice header position determining means, wherein the position of the slice header is determined so that the amount of data in each slice in the picture is maintained at substantially the same value irrespective of the type of the picture.

In one embodiment of the invention, the encoding means further comprises means for switching between a first mode of low compression rate and a second mode of high compression rate, wherein the position of the slice header is determined so that the number of slices in the picture in the first mode is larger than the number of slices in the picture in the second mode.

In another embodiment of the invention, the apparatus further comprises reproduction means for reproducing image data recorded in the recording medium and decoding means for decoding the reproduced image data.

An optical disk for recording data according to the present invention is characterized in that the data is coded in accordance with an image encoding method, the image encoding method comprising the steps of: specifying a type of a picture in a picture sequence including an I-picture, a P-picture and a B-picture; determining a position of at least one slice header in the picture in accordance with the type of the picture; and inserting at least one slice header at the position determined in the determining step, wherein the position of the slice header is determined so that at least one of the relationships $N_i > N_b$ and $N_p > N_b$ is satisfied, where $N_i$ denotes the number of slices in the I-picture, $N_p$ denotes the number of slices in the P-picture and $N_b$ denotes the number of slices in the B-picture.

Alternatively, an optical disk for recording data according to the present invention is characterized in that the data is coded in accordance with an image encoding method, the image encoding method comprising the steps of: detecting an amount of data in a picture in a picture sequence including an I-picture, a P-picture and a B-picture; determining a position of at least one slice header in the picture in accordance with the amount of data in the picture; and inserting at least one slice header at the position determined in the determining step, wherein the position of the slice header is determined so that the amount of data contained in each slice in the picture is maintained at substantially the same value irrespective of the type of the picture.

According to the present invention, the number of the slices is increased in each I-picture and P-picture. This makes it possible to correct an error occurring in an I or P-picture at an early point in time. As a result, severe deterioration of the reproduced image due to inter-frame propagation of the error is prevented. On the other hand, the number of the slices in each B-picture is kept small. The reason is that an error occurring in a B-picture is not propagated to the other frames, so that any severe image deterioration is not likely to occur due to the error. Since a GOP includes more B-pictures than I-pictures or P-pictures, the overall redundancy of the image data is reduced. Thus, the present invention makes it possible to restrain increase in the image data redundancy, and to reduce to the propagation range of any error, thereby greatly reducing the deterioration of the image.

Thus, the invention described herein makes possible the advantages of (1) providing an image encoding method in which increase of the image redundancy is restrained and in which errors are propagated in a reduced range of pictures; (2) providing an image encoding circuit, a recording apparatus, and a recording/reproducing apparatus in which increase of the image redundancy is restrained and in which errors are propagated in a reduced range of pictures; and (3) providing an optical disk for recording data coded by the image encoding method.

These and other advantages of the present invention will become apparent to those skilled in the art upon reading and understanding the following detailed description with reference to the accompanying figures.

BRIEF DESCRIPTION OF THE DRAWINGS

FIGS. 1A to 1E are views for describing the principles for an image encoding method according to the present invention.

FIGS. 4A and 4B are views for describing the principles for an image encoding method according to the present invention.

DESCRIPTION OF THE PREFERRED EMBODIMENTS

Figure 2:
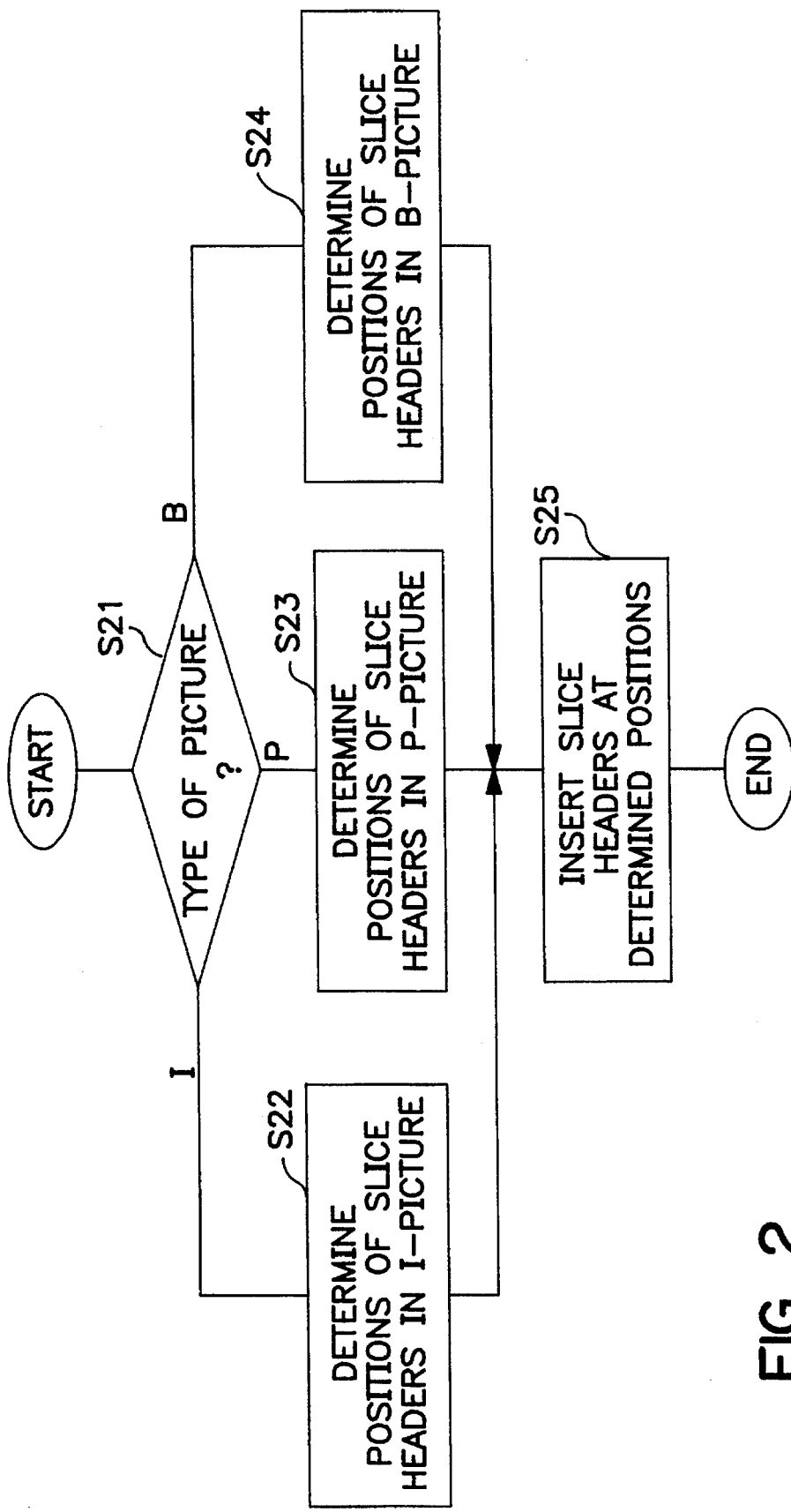
FIG. 2 is a flowchart showing an image encoding method according to the present invention.

Hereinafter, the present invention will be described by way of examples, with reference to the accompanying drawings.

First, principles for the image encoding method according to the present invention will be described.

FIG. 1A shows an example of a frame sequence according to an image encoding method proposed by MPEG. One frame corresponds to one picture, and the frames are coded picture by picture. The frame sequence includes three kinds of pictures, namely, I-pictures, P-pictures, and B-pictures. An I-picture is a picture obtained by performing an intra-coding, which uses closed information within one image. Although the intra-coding has a poor compression efficiency, random access and high-speed reproduction are realized by utilizing I-pictures. A P-picture is a picture obtained by performing an inter-frame predictive coding. The inter-frame predictive coding uses either a temporally preceding I-picture or P-picture as a reference picture from which to derive a difference. A B-picture is a picture obtained by performing a bidirectional predictive coding. The bidirectional predictive coding uses a temporally preceding I-picture or P-picture, a temporally succeeding I-picture or P-picture, and an interpolated image generated from both of the preceding and succeeding pictures.

In the exemplary frame sequence shown in FIG. 1A, the 1st and 13th frames are I-pictures; the 4th, 7th, and 10th frames are P-pictures; the 2nd, 3rd, 5th, 6th, 8th, 9th, 11th, and 12th frames are B-pictures. The 1st frame to 12th frame constitute one GOP (Group Of Pictures).

Each I-picture, P-picture, and B-picture has a plurality of slices. Each slice is a band having a width of 16 pixels and a length of an arbitrary value. Each slice has a slice header and a plurality of macro blocks following the slice header. The slice header is used for resetting motion vectors and differences in DC components within an image. The first one of the macro blocks included in a slice includes data indicating a position in the image. Such data structure makes it possible, if an error occurs in a slice, to correct the error in the next slice so that the correct coding is restarted from the next slice.

FIG. 1B shows exemplary structures of pictures. Each picture includes slices S1 to S30. One slice has a length equivalent to one horizontal scanning line (i.e. from the left end to the right end of the image). Each of the slices S1 to S30 has a slice header and 44 macro blocks following the slice header. Each macro block includes 4 blocks. Each block includes 8×8 pixels.

FIG. 1C shows exemplary structures of pictures. Each picture includes slices S1 to S120. The number of the slices included in each picture shown in FIG. 1C is 4 times as large as the number of the slices in each picture shown in FIG. 1B.

By increasing the number of the slices, respective intervals between slice headers are reduced. As a result, a time period between a slice in which an error has occurred and the next slice decreases. This makes it possible to quickly correct the error and to restart the correct coding corresponding to the proper position in the image from the next slice, thereby restraining the error from being propagated in a large range of pictures. The propagation range of errors for the pictures shown in FIG. 1C is almost one fourth of the propagation range of errors for the pictures shown in FIG. 1B.

However, an increase in the number of the slices in one picture leads to an increase in the number of the slice headers, which in turn leads to an increase in the amount of additional information besides image data. As a result, the redundancy of the image data increases, which is not a desirable situation for recording media that require a large capacity, such as optical disks.

The propagation range of errors along the time axis direction depends on the kind of the picture. Specifically, when an error occurs in an I-picture, the error is propagated to all the P-pictures and B-pictures included in the GOP. This is because the I-picture is used in the coding of the P-pictures and B-pictures. For example, an error occurring in the first frame (i.e. I-picture) shown in FIG. 1A would be propagated from the second frame through the 12th frame. When an error occurs in a P-picture, the error is propagated to the succeeding pictures thereof. On the other hand, when an error occurs in a B-picture, the error is not propagated along the direction of the time axis. This is because a B-picture is not used in the prediction of any other picture. Thus, an error occurring in a B-picture causes much less image deterioration than an error occurring in an I-picture or a P-picture would.

FIG. 2 is a flowchart showing the image encoding method according to the present invention. At step S21, the type of each picture included in the picture sequence is determined. If it is determined to be an I-picture at step S21, the positions of the slice headers are determined so that a predetermined number $N_i$ of slice headers are inserted into the I-picture with substantially equal intervals at step S22. If it is determined to be a P-picture at step S21, the positions of the slice headers are determined so that a predetermined number $N_p$ of slice headers are inserted into the P-picture with substantially equal intervals at step S23. If it is determined to be a B-picture at step S21, the positions of the slice headers are determined so that the a predetermined number $N_b$ of slice headers are inserted into the B-picture with substantially equal intervals at step S24. Herein, the numbers $N_i$, $N_p$, and $N_b$ satisfy at least one of the relationships $N_i > N_b$ and $N_p > N_b$. At step S25, the slice headers are inserted at the positions determined at step S22, S23, or S24.

As is described above, according to the image encoding method of the present invention, the number of the slices is increased in the I-pictures and P-pictures, while it is decreased in the B-pictures. Since the data of an I-picture is generally more important than data of a P-picture or a B-picture, it is preferable that the relationship $N_i > N_p > N_b$ is satisfied, as is shown in FIG. 1D.

In other words, according to the image encoding method of the present invention, the number of the macro blocks included in one slice is decreased in the I-pictures and the P-pictures, while it is increased in the B-pictures. Specifically, slice headers are inserted into the respective pictures so that at least one of the relationships $M_i < M_b$ and $M_p < M_b$ is satisfied. Herein, $M_i$ denotes the number of macro blocks included in each slice in each I-picture; $M_p$ denotes the number of macro blocks included in each slice in each P-picture; and $M_b$ denotes the number of macro blocks included in each slice in each B-picture. Moreover, it is preferable that the relationship $M_i < M_p < M_b$ is satisfied for at least the same reason mentioned above.

By increasing the number of the slices in the I-pictures or P-pictures, a quicker restoration to the proper position is realized, thereby preventing the error from being propagated in a large range along the direction of the time axis. Since the number of the slices in the B-pictures is reduced, the increase in the total number of the slices is restrained. As a result, the overall increase in the redundancy of the image data due to an increase in the number of the slices is prevented. Since any error occurring in a B-picture is not propagated to the other pictures, reduction of the number of the slices in the B-pictures does not create much problem.

On the right end of each of FIGS. 1B, 1C, and 1D is shown the number of slices (slice headers) in one GOP. In the pictures shown in FIG. 1B, the number of the slices in one GOP is 360. In the pictures shown in FIG. 1C, the number of the slices in one GOP is 1440. In the pictures shown in FIG. 1D, the number of the slices in one GOP is 340. Thus, the pictures shown in FIG. 1D each have a structure immune to errors because of the increased number of slices in the I-pictures and P-pictures, and yet has a decreased total number of slices in the whole GOP. As a result, it will be understood that the redundancy of the image data is reduced as a whole.

It will be appreciated that the numbers of the various kinds of pictures for one GOP, kinds of pictures, and numbers of the slices in one picture as illustrated above are employed by way of examples and that the present invention does not provide any limitations thereto.

As has been described, according to the present invention, an image encoding method is provided in which increase of the image redundancy is restrained and in which errors are propagated in a reduced range of pictures.

Although a fixed number of slices are present in one picture in the above-discussed example, it is also applicable to determine the number of the slices in each picture in accordance with the amount of data contained in that picture. In general, an I-picture has the most amount of data, followed by a P-picture and a B-picture, respectively. Accordingly, by detecting the amount of data in the picture and inserting one slice header for every predetermined amount of detected data, pictures shown in FIG. 1E are obtained in which each I-picture has more slices than each P-picture and each P-picture has more slices than each B-picture.

Figure 3:
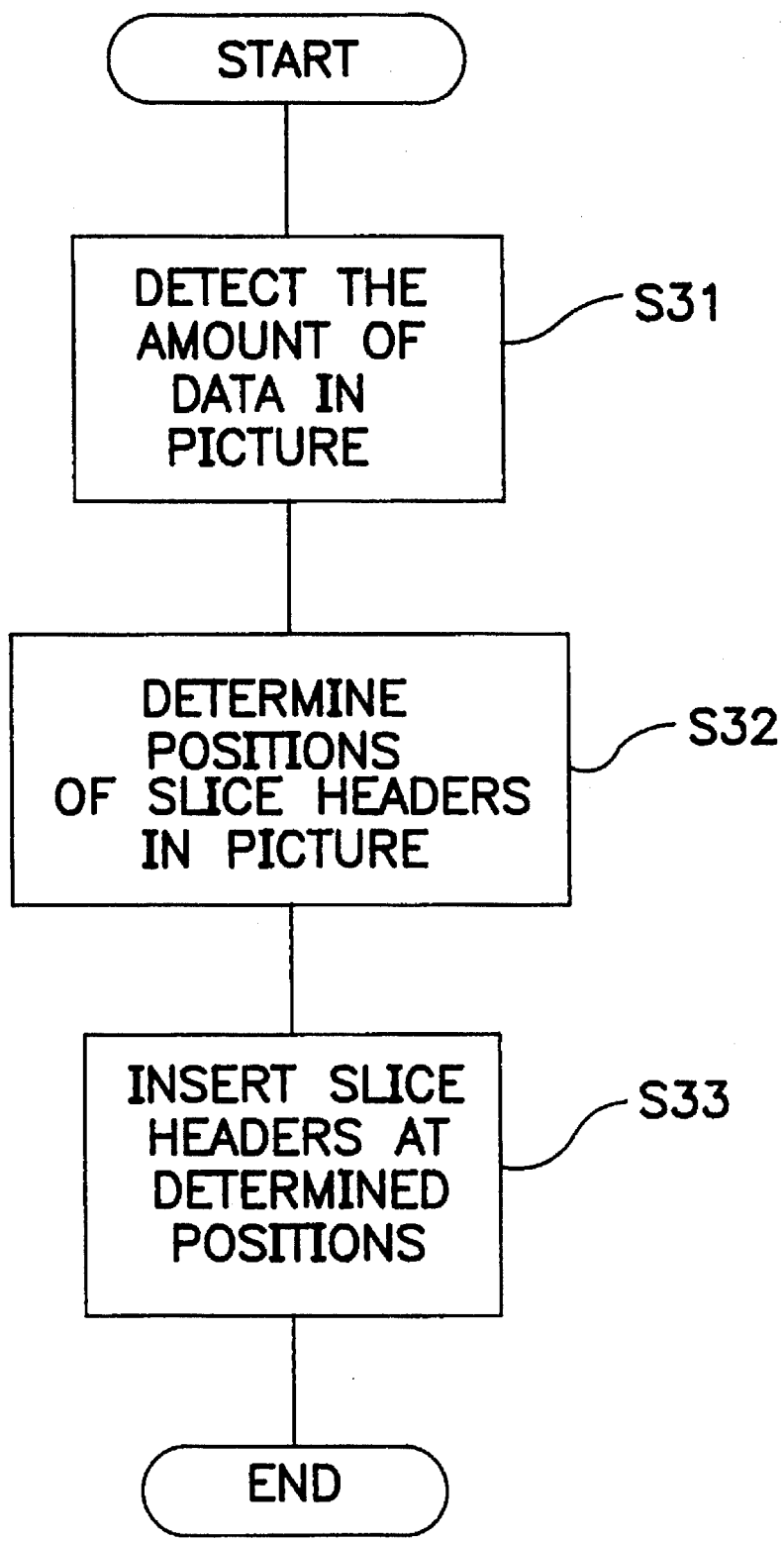
FIG. 3 is a flowchart showing another image encoding method according to the present invention.

FIG. 3 is a flowchart showing another image encoding method according to the present invention. At step S31, the amount of data included in each picture is detected. At step S32, the positions of the slice headers in the picture are determined so that a larger number of slice headers are inserted into a picture having a larger detected amount of data, whereby the amount of data in one slice is maintained at substantially the same value irrespective of the kind of the picture. At step S33, the slice headers are inserted at the positions determined at step S32. Thus, the number $N_i$ of the slices in each I-picture, the number $N_p$ of the slices in each P-picture, and the number $N_b$ of the slices in each B-picture substantially satisfy the relationship $N_i > N_p > N_b$. Accordingly, the same effect as described above can be obtained.

In cases where the redundancy greatly varies depending on the image data, it is preferable that the lengths of the slices are variable.

FIGS. 4A and 4B each show exemplary pictures according to the image encoding method of the present invention in cases where the system has a plurality of compression modes. In this example, it is assumed that the system has a high image quality mode (such as 6 Mbps; hereinafter referred to as the 'HQ mode') in which the image data is compressed at a low compression rate and a low image quality mode (such as 3 Mbps; hereinafter referred to as the 'LQ mode') in which the image data is compressed at a high compression rate.

In the HQ mode, an increase in the image data redundancy due to an increase in the number of the slice headers does not cause much problem because the HQ mode requires a large amount of data in any case. Accordingly, a system which is immune to errors can be obtained by increasing the number of the slices in each picture.

On the other hand, in the LQ mode, the image data redundancy should be kept minimum. Therefore, any increase in the number of the slices in the pictures is undesirable.

In the image encoding method of the present invention, as is shown in FIGS. 4A and 4B, slice headers are inserted into the pictures so that the number of the slices is larger in the HQ mode than the number of the slices in the LQ mode. Specifically, slice headers are inserted into the pictures so that the relationships $N_{hi} > N_{li}$, $N_{hp} > N_{lp}$, and $N_{hb} > N_{lb}$ are satisfied where $N_{hi}$, $N_{hp}$, and $N_{hb}$ denote the numbers of the slices in each I-picture, each P-picture, and each B-picture, respectively, in the HQ mode, and $N_{li}$, $N_{lp}$, and $N_{lb}$ denote the numbers of the slices in each I-picture, each P-picture, and each B-picture, respectively, in the LQ mode.

Each kind of pictures may have a fixed number of slices in each picture, or may have a variable number of slices depending on the amount of data in the picture. An optimum balance between error-immunity and redundancy can be obtained by varying the number of the slices in each picture depending on the compression mode (i.e. either the HQ or LQ mode) in the above-mentioned manner.

In the image encoding method according to the present invention, the number of pictures need not be fixed, but may adaptively be varied depending on the amount of data.

Figure 5A:
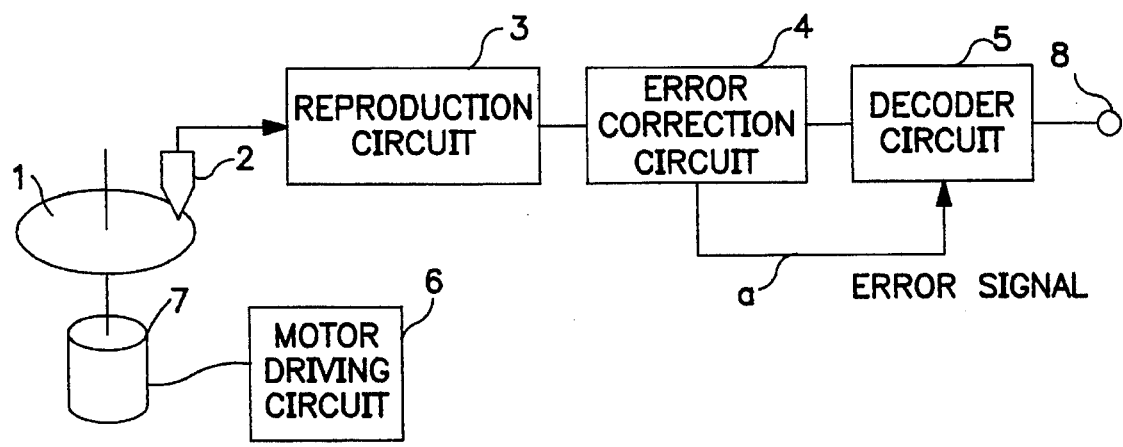
FIG. 5A is a block diagram showing a configuration for an image apparatus according to the present invention.
Figure 5B:
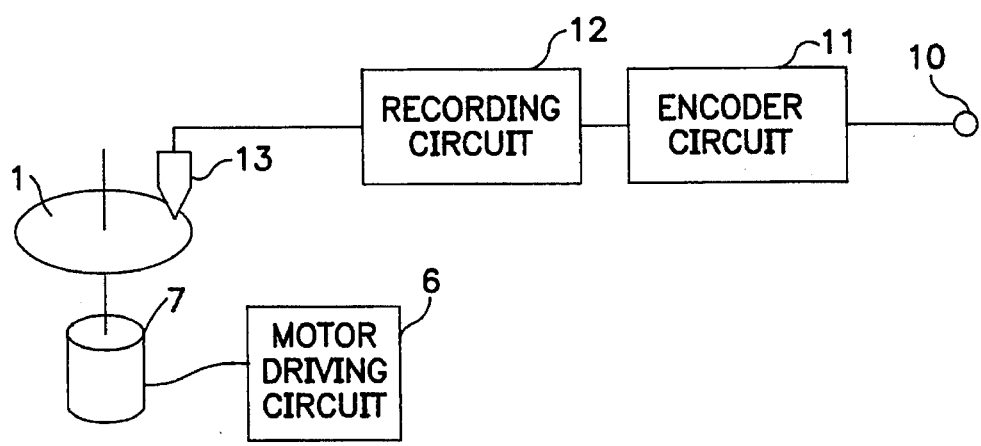
FIG. 5B is a block diagram showing a configuration for an image apparatus according to the present invention.

Hereinafter, a recording/reproducing apparatus which implements the image encoding method according to the present invention will be described. FIG. 5A shows a configuration for a reproduction section of the recording/reproducing apparatus. FIG. 5B is a block diagram showing a configuration for a recording section of the recording/reproducing apparatus. Although an optical disk apparatus is described as an example of the recording/reproducing apparatus below, the present invention provides no limitation as to the kind of recording/reproducing apparatus. The present invention is applicable to any type of recording/reproducing apparatus such as a disk device and a VTR.

With reference to FIG. 5A, a reproducing operation of the recording/reproducing apparatus is described below. An optical disk 1 is rotated by a motor 7, which is driven by a motor driving circuit 6. It is assumed that image data recorded by the image encoding method according to the present invention is stored in the optical disk 1. A signal reproduced by a reproduction circuit 3, with the use of the an optical head 2, is input to an error correction circuit 4. The error correction circuit 4 judges whether there exits an error in the reproduced signal or not, and corrects the error if necessary. Then, the error correction circuit 4 outputs the reproduced signal to a decoder circuit 5. If error correction is impossible, the error correction circuit 4 outputs an error signal a indicating that error correction was impossible, as well as the reproduced signal, to the decoder circuit 5.

The decoder circuit 5 normally decodes the reproduced signal and outputs the reproduced image data through a terminal 8. On receiving an error signal a, however, the decoder circuit 5 stops decoding and waits until the next slice header appears, so as to restart the decoding from the next error-free slice data.

The intervals between slice headers are optimized in accordance with the kind of picture by the image encoding method according to the invention, as is described above. This makes it possible to decode the reproduced signal with a minimum propagation of errors.

Figure 6A:
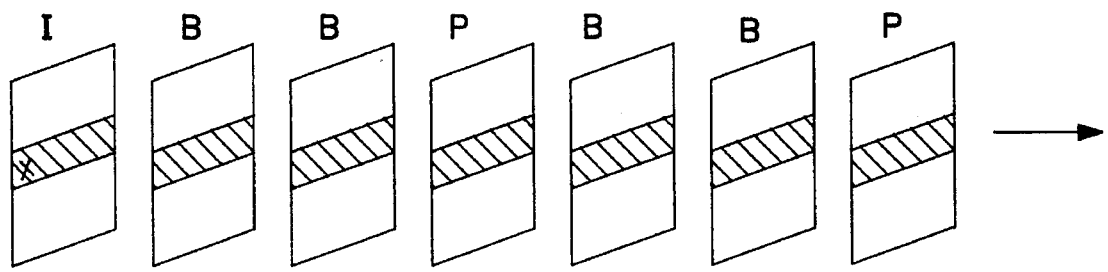
FIGS. 6A and 6B are views each showing an exemplary propagation range of an error occurring in an I-picture.
Figure 6B:
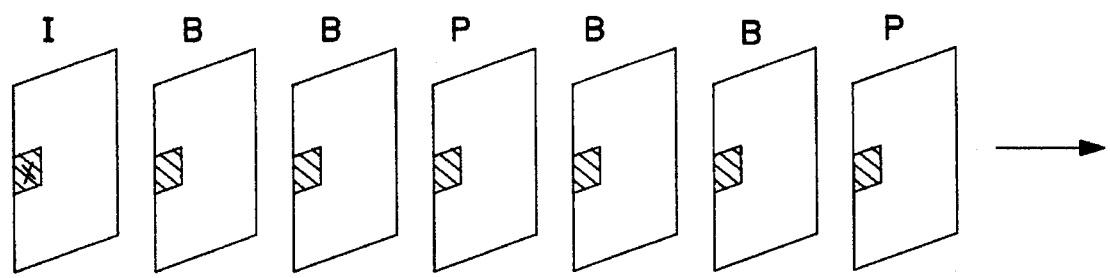

The propagation range of errors in the reproducing operation will be described in more detail below:

FIG. 6A shows an exemplary propagation range of errors in the case where image data which is recorded on the optical disk 1 by a conventional image encoding method is to be reproduced. FIG. 6B shows an exemplary propagation range of errors in the case where image data which is recorded on the optical disk 1 by the image encoding method of the present invention is to be reproduced.

It is assumed that an error has occurred at point x in an I-picture shown in FIGS. 6A and 6B. The hatched portions in FIGS. 6A and 6B each show a portion where decoding of the reproduced signal is impossible due to propagation of the error occurring at point x. An error occurring in a slice can be corrected in the next slice. Each picture shown in FIG. 6B has a large number of slices as compared to that of each picture shown in FIG. 6A, so that the intervals between slice headers are smaller. Accordingly, an error occurring in a picture can be corrected at a relatively early point in time. This minimizes the size of the propagation range of errors along the time axis direction.

Next, a recording operation of the recording/reproducing apparatus is described with reference to FIG. 5B. An image signal is input to an encoder circuit 11 through a terminal 10. The encoder circuit 11 is a circuit for implementing the image encoding method of the present invention as mentioned above. The configuration and operation of the encoder circuit 11 will be described in detail later. The output of the encoder circuit 11 is supplied to a recording circuit 12, and is recorded on the optical disk 1 with the use of a recording head 13.

Figure 7:
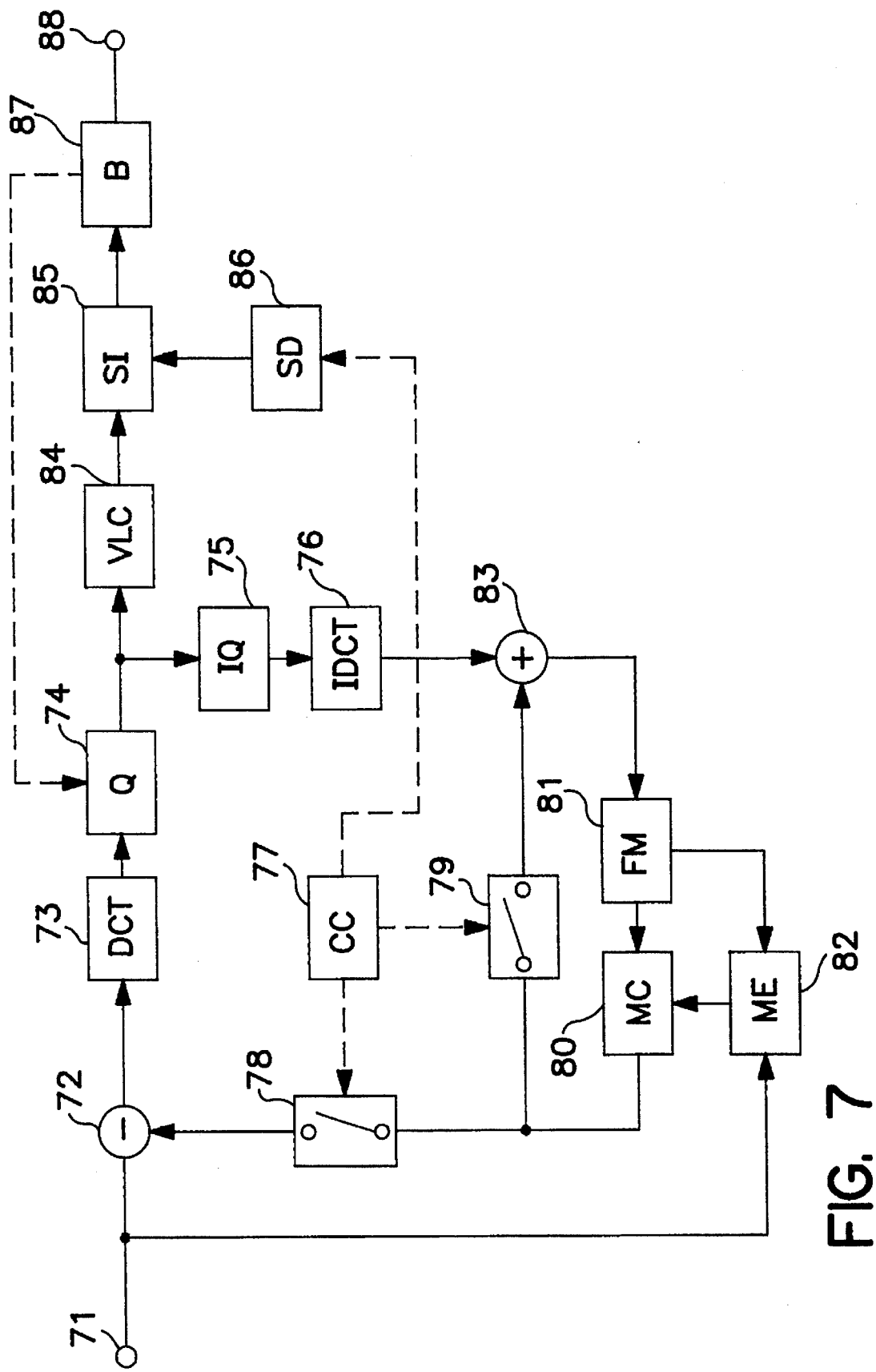
FIG. 7 is a block diagram showing a configuration for an encoder circuit according to the present invention.

FIG. 7 shows a configuration for an encoder circuit 11 according to the present invention. In this example, the encoder circuit 11 compresses data by the use of a motion compensated DCT method. In the motion compensated DCT method, one frame which is periodically selected from the input image data is compressed by using only the data in that frame, and for each of the remaining frames, the difference from the respective previous frame is compressed and transmitted. For the intra-frame compression and the inter-frame compression, a discrete cosine transform which is one of orthogonal base transforms is used, for example. In addition, before calculation of the difference between frames, a motion vector of an image between the current frame and the previous frame is first detected, and then the motions of the image are compensated based on the motion vector. Thus, the compression efficiency is remarkably enhanced.

Hereinafter, the operation of the encoder circuit 11 shown in FIG. 7 will be described. The solid lines in FIG. 7 show the flow of data, while the broken lines show the flow of control.

The image data is input through an input terminal 71. A subtracter 72 is used for calculating the difference from the previous frame. A coding control circuit 77 (shown as CC) controls the turning on and off of refresh switches 78 and 79 in accordance with the type of picture to be processed. In cases where the picture to be processed is an I-picture, the coding control circuit 77 turns off the refresh switches 78 and 79 (i.e. intra-frame compression). As a result, the subtracter 72 does not operate. The input image data is subjected to the discrete cosine transform (DCT) by a DCT circuit 73. The discrete cosine transform is usually performed in two dimensions. If the discrete cosine transform is performed for each block of 8×8, 8×8 coefficients are obtained as the result of the transform. The data obtained by the DCT is inherently a continuous amount. However, since the operation is performed by using a digital circuit, each of the 64 coefficients is obtained as a digital value having a predetermined bit width. Next, the data is subjected to a bit assignment process, which is conducted for each frequency component, by a quantizer 74 (shown as Q). Generally, since the lower-frequency components are important for constituting the image, a larger number of bits are assigned to the lower-frequency components. Since the higher-frequency components are less important for constituting the image, a smaller number of bits are assigned to the higher-frequency components. A variable length coding circuit 84 (shown as VLC) performs a variable length coding for the output of quantizer 74. In the variable length coding, a shorter code length is assigned to data which appears with a higher statistic frequency. By using variable length coding, the statistically redundant component included in the data is removed. In such coding, the Huffman code is generally used. However, the variable length coding is not an indispensable process of the image encoding method according to the present invention.

The output of the quantizer 74 is inversely quantized by an inverse quantizer 75 (shown as IQ). Specifically, the inverse quantizer 75 renders the amplitude of each frequency component back to the original amplitude, contrary to the quantization process. Each coefficient whose, original amplitude is thus recovered by the de-quantized is reconstructed into the original data by an inverse DCT circuit 76 (shown as IDCT). If the reconstructed image data is intra-frame image data, the adder 83 does not operate. Thereafter, the reconstructed image data is delayed by a predetermined number of frames by a frame memory 81 (shown as FM). The delayed image data is input to a motion estimation circuit 82 (shown as ME). The motion estimation circuit 82 calculates the motion amount from the input image data. A motion compensation circuit 82 (shown as MC) moves the position of the image data in accordance with the calculated motion amount. The image data which is thus motion-compensated is used for calculating its difference from the next image data by the subtracter 72.

The image data of a few succeeding frames is used for compressing the respective differences from the previous frames. The coding control circuit 77 turns on the refresh switches 78 and 79 if the picture to be processed is a P-picture or a B-picture (i.e. inter-frame compression). The refresh switch 78 is turned on when differences between frames are to be calculated. When the refresh switch 78 is turned on, the subtracter 72 operates. The refresh switch 79 is repeatedly turned on and off at the same cycle as that of the refresh switch 78. When the refresh switch 79 is on, the adder 83 operates so as to add the inter-frame difference data to the data of the previous frame. The added data is used for reconstructing the frame. The variable length coding circuit 84 performs variable length coding for the inter-frame compression data as well.

A slice header position determining circuit 86 (shown as SD) receives a signal identifying the type of a picture to be processed from the coding control circuit 77. Thus, the slice header position determining circuit 86 determines the positions of the slice headers in accordance with the type of the picture. Specifically, the slice header position determining circuit 86 determines the positions of the slice headers so that at least one of the relationships $N_i > N_b$ and $N_p > N_b$ is satisfied, where $N_i$ denotes the number of the slices in each I-picture, $N_p$ denotes the number of the slices in each P-picture, $N_b$ denotes the number of the slices in each B-picture.

The output of the slice header inserting circuit 85 is supplied to a buffer circuit 87 (shown as B) so as to be output through an output terminal 88.

The slice header inserting circuit 85 is coupled to the output of the variable length coding circuit 84 in the example mentioned above. However, the present invention is not limited to such an arrangement. The slice header inserting circuit 85 can be inserted in any position within the apparatus as long as it can change the number of slices in the picture according to the type of the picture. For example, the slice header inserting circuit 85 may be coupled to the output of the DCT circuit 73, or the output of the quantizer 74.

Figure 8:
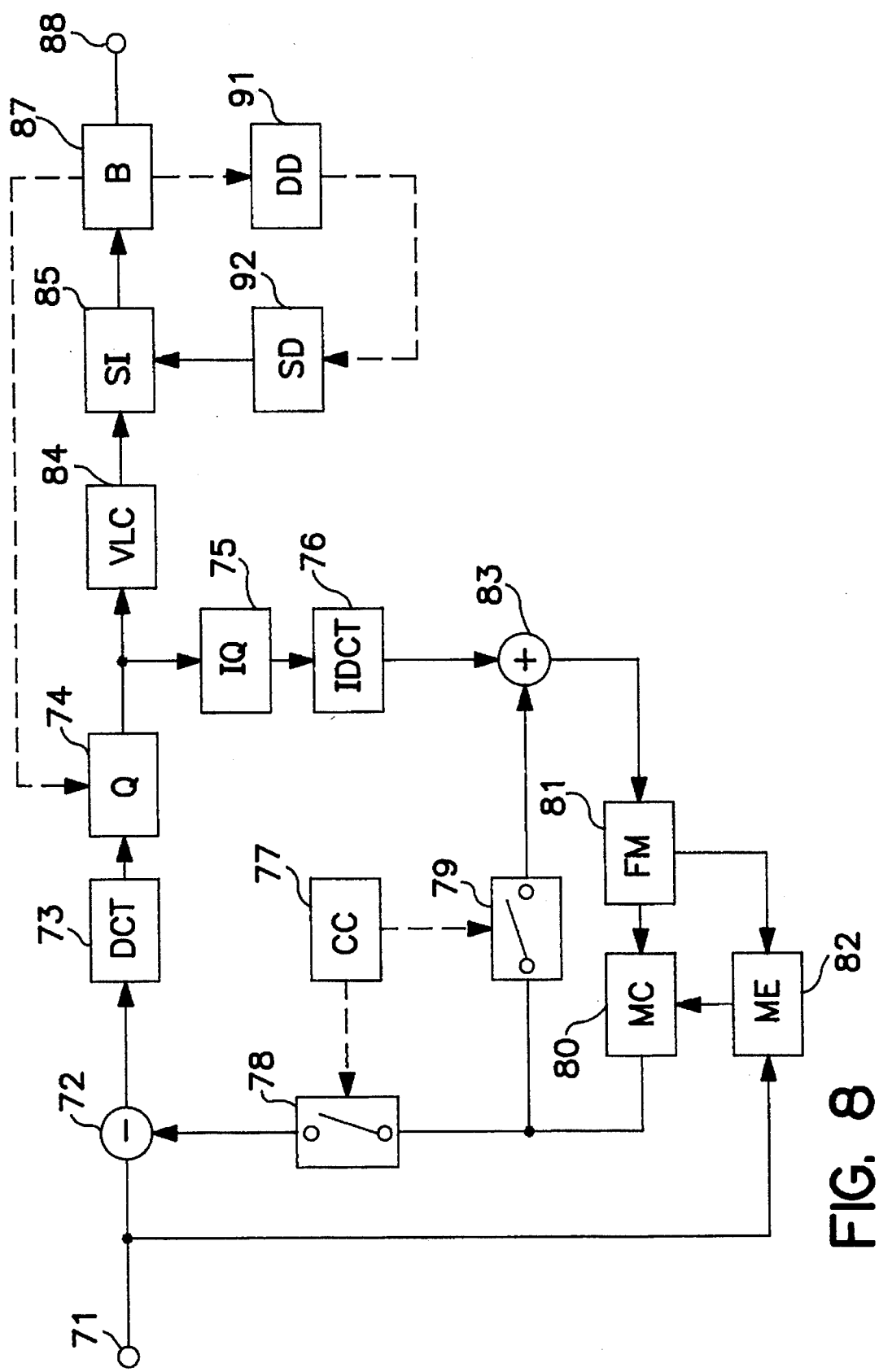
FIG. 8 is a block diagram showing a configuration for another encoder circuit according to the present invention.

FIG. 8 shows another configuration for an encoder circuit 11 according to the invention. Components which also appear in FIG. 7 are indicated by the same reference numerals, and descriptions thereof are omitted.

A data amount detection circuit 91 (shown as DD) counts and detects the amount of data in a picture which is temporarily stored in the buffer circuit 87. The data amount detection circuit 91 transmits a signal indicating the detected amount of data to the slice header position determining circuit 92. The slice header position determining circuit 92 receives the signal, and increases the number of the slice headers as the amount of data in the picture increases. Thus, the positions of the slice headers in the picture are determined so that the amount of data in one slice is maintained at substantially the same value irrespective of the type of the picture. Then, the slice header inserting circuit 85 inserts the slice headers at the positions determined by the slice header position determining circuit 92.

The slice header inserting circuit 85 is coupled to the output of the variable length coding circuit 84 in the example mentioned above. However, the present invention is not limited to such an arrangement. The slice header inserting circuit 85 can be inserted at any place in the apparatus as long as it is capable of detecting the amount of data in the picture as mentioned above. For example, the slice header inserting circuit 85 may be coupled to the output of the DCT circuit 73, or the output of the quantizer 74.

As has been described, according to the present invention, the number of the slices is increased in each I-picture and each P-picture. This makes it possible to correct an error occurring in an I or P-picture at an early point in time. As a result, severe deterioration of the reproduced image due to inter-frame propagation of the error is prevented. On the other hand, the number of the slices in each B-picture is kept small. The reason is that an error occurring in a B-picture is not propagated to the other frames, so that no severe image deterioration is likely to occur due to the error. Since any GOP is likely to have more B-pictures than I-pictures or P-pictures, the overall redundancy of the image data is reduced. Thus, the present invention makes it possible to restrain increase in the image data redundancy, and to reduce to the propagation range of errors along the time axis direction, thereby greatly reducing the deterioration of the image. In addition, an optical disk for recording data which is coded in accordance with the image encoding method of the present invention can be obtained.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method for encoding image data comprising the steps of:

specifying a type of a picture in a picture sequence including an I-picture, a P-picture and a B-picture;

determining a position of at least one slice header in the picture in accordance with the type of the picture; and inserting signals representing at least one slice header within a stream of signals representing the picture at the position determined in the determining step, wherein the position of the slice header is determined so that at least one of the relationships $N_i > N_b$ and $N_p > N_b$ is satisfied, where $N_i$ denotes the number of slices in the I-picture, $N_p$ denotes the number of slices in the P-picture and $N_b$ denotes the number of slices in the B-picture.

2. A method according to claim 1, wherein the position of the slice header is determined so that at least one of the relationships $M_i < M_b$ and $M_p < M_b$ is satisfied, where $M_i$ denotes the number of macro blocks included in each slice in the I-picture, $M_p$ denotes the number of macro blocks included in each slice in the P-picture and $M_b$ denotes the number of macro blocks included in each slice in the B-picture.

3. A method according to claim 1, further comprising a step of switching between a first mode of low compression rate and a second mode of high compression rate, wherein the position of the slice header is determined so that the number of slices in the picture in the first mode is larger than the number of slices in the picture in the second mode.

4. A method for encoding image data comprising the steps of:

detecting an amount of data in a picture in a picture sequence including an I-picture, a P-picture and a B-picture;

determining a position of at least one slice header in the picture in accordance with the amount of data in the picture; and inserting signals representing at least one slice header within a stream of signals representing the picture at the position determined in the determining step, wherein the position of the slice header is determined so that the amount of data contained in each slice in the picture is maintained at substantially the same value irrespective of the type of the picture.

5. A method according to claim 4, further comprising a step of switching between a first mode of low compression rate and a second mode of high compression rate, wherein the position of the slice header is determined so that the number of slices in the picture in the first mode is larger than the number of slices in the picture in the second mode.

6. A circuit for encoding image data comprising:

picture type specifying means for specifying a type of a picture in a picture sequence including an I-picture, a P-picture and a B-picture;

slice header position determining means for determining a position of at least one slice header in the picture in accordance with the type of the picture; and slice header inserting means for inserting signals representing at least one slice header within a stream of signals representing the picture at the position determined by the slice header position determining means, wherein the position of the slice header is determined so that at least one of the relationships $N_i>N_b$ and $N_p>N_b$ is satisfied, where $N_i$ denotes the number of slices in the I-picture, $N_p$ denotes the number of slices in the P-picture and $N_b$ denotes the number of slices in the B-picture.

7. A circuit according to claim 6, wherein the position of the slice header is determined so that at least one of the relationships $M_i<M_b$ and $M_p<M_b$ is satisfied, where $M_i$ denotes the number of macro blocks included in each slice in the I-picture, $M_p$ denotes the number of macro blocks included in each slice in the P-picture and $M_b$ denotes the number of macro blocks included in each slice in the B-picture.

8. A circuit according to claim 6, further comprising means for switching between a first mode of low compression rate and a second mode of high compression rate, wherein the position of the slice header is determined so that the number of slices in the picture in the first mode is larger than the number of slices in the picture in the second mode.

9. A circuit for encoding image data comprising:

detecting means for detecting an amount of data in a picture in a picture sequence including an I-picture, a P-picture and a B-picture;

slice header position determining means for determining a position of at least one slice header in the picture in accordance with the amount of data in the picture; and slice header inserting means for inserting signals representing at least one slice header within a stream of signals representing the picture at the position determined by the slice header position determining means, wherein the position of the slice header is determined so that the amount of data in each slice in the picture is maintained at substantially the same value irrespective of the type of the picture.

10. A circuit according to claim 9, further comprising means for switching between a first mode of low compression rate and a second mode of high compression rate, wherein the position of the slice header is determined so that the number of slices in the picture in the first mode is larger than the number of slices in the picture in the second mode.

11. An apparatus comprising:

encoding means for encoding image data; and recording means for recording the encoded image data in a recording medium, the encoding means comprising:

picture type specifying means for specifying a type of a picture in a picture sequence including an I-picture, a P-picture and a B-picture;

slice header position determining means for determining a position of at least one slice header in the picture in accordance with the type of the picture; and slice header inserting means for inserting signals representing at least one slice header within a stream of signals representing the picture at the position determined by the slice header position determining means, wherein the position of the slice header is determined so that at least one of the relationships $N_i>N_b$ and $N_p>N_b$ is satisfied, where $N_i$ denotes the number of slices in the I-picture, $N_p$ denotes the number of slices in the P-picture and $N_b$ denotes the number of slices in the B-picture.

12. An apparatus according to claim 11, wherein the position of the slice header is determined so that at least one of the relationships $M_i<M_b$ and $M_p<M_b$ is satisfied, where $M_i$ denotes the number of macro blocks included in each slice in the I-picture, $M_p$ denotes the number of macro blocks included in each slice in the P-picture and $M_b$ denotes the number of macro blocks included in each slice in the B-picture.

13. An apparatus according to claim 11, wherein the encoding means further comprises means for switching between a first mode of low compression rate and a second mode of high compression rate, wherein the position of the slice header is determined so that the number of slices in the picture in the first mode is larger than the number of slices in the picture in the second mode.

14. An apparatus according to claim 11, further comprising reproduction means for reproducing image data recorded in the recording medium and decoding means for decoding the reproduced image data.

15. An apparatus comprising:

encoding means for encoding image data; and recording means for recording the encoded image data in a recording medium, the encoding means comprising:

detecting means for detecting an amount of data in a picture in a picture sequence including an I-picture, a P-picture and a B-picture;

slice header position determining means for determining a position of at least one slice header in the picture in accordance with the amount of data in the picture; and slice header inserting means for inserting signals representing at least one slice header within a stream of signals representing the picture at the position determined by the slice header position determining means, wherein the position of the slice header is determined so that the amount of data in each slice in the picture is maintained at substantially the same value irrespective of the type of the picture.

16. An apparatus according to claim 15, wherein the encoding means further comprises means for switching between a first mode of low compression rate and a second mode of high compression rate, wherein the position of the slice header is determined so that the number of slices in the picture in the first mode is larger than the number of slices in the picture in the second mode.

17. An apparatus according to claim 15, further comprising reproduction means for reproducing image data recorded in the recording medium and decoding means for decoding the reproduced image data.

18. An optical disk for recording data which is coded in accordance with an image encoding method, the image encoding method comprising the steps of:

specifying a type of a picture in a picture sequence including an I-picture, a P-picture and a B-picture;

determining a position of at least one slice header in the picture in accordance with the type of the picture; and inserting signals representing at least one slice header within a stream of signals representing the picture at the position determined in the determining step, wherein the position of the slice header is determined so that at least one of the relationships $N_i > N_b$ and $N_p > N_b$ is satisfied, where $N_i$ denotes the number of slices in the I-picture, $N_p$ denotes the number of slices in the P-picture and $N_b$ denotes the number of slices in the B-picture.

19. An optical disk for recording data which is coded in accordance with an image encoding method, the image encoding method comprising the steps of:

detecting an amount of data in a picture in a picture sequence including an I-picture, a P-picture and a B-picture;

determining a position of at least one slice header in the picture in accordance with the amount of data in the picture; and inserting signals representing at least one slice header within a stream of signals representing the picture at the position determined in the determining step, wherein the position of the slice header is determined so that the amount of data contained in each slice in the picture is maintained at substantially the same value irrespective of the type of the picture.

* * * * *